United States Patent Office 3,839,495
Patented Oct. 1, 1974

3,839,495
IMPACT-RESISTANT OLEFINIC-NITRILE COPOLYMERS
Dorothy C. Prem, Warrensville Heights, and June T. Duke, Chagrin Falls, Ohio, assignors to The Standard Oil Company, Cleveland, Ohio
No Drawing. Filed May 17, 1973, Ser. No. 361,336
Int. Cl. C08g 45/04
U.S. Cl. 260—836
10 Claims

ABSTRACT OF THE DISCLOSURE

Impact-resistant polymers having low permeability to gases and vapors and excellent thermal color stability are prepared by polymerizing an olefinic nitrile, such as acrylonitrile, optionally with an olefinic ester, such as methyl acrylate, in an aqueous medium in the presence of an elastomer which is a polymer of a conjugated diolefin and at least one ester of an olefinically unsaturated carboxylic acid, such as ethyl acrylate.

---

The present invention relates to novel polymeric compositions which have low permeability to gases and vapors and improved resistance to discoloration by heat, and more particularly pertains to synthetic polymeric resins which are composed of an olefinically unsaturated nitrile, an ester of an olefinically unsaturated carboxylic acid, and a conjugated diene monomer, and to a process for preparing same.

The polymeric products of the present invention are prepared by polymerizing a major portion of an olefinically unsaturated nitrile, such as acrylonitrile, and a minor portion of an ester of an olefinically unsaturated carboxylic acid, such as methyl acrylate, in the presence of a preformed rubbery copolymer composed of a conjugated diene monomer, such as butadiene, and at least one ester of an olefinically unsaturated carboxylic acid, such as ethyl acrylate.

The olefinically unsaturated nitriles useful in the present invention are the alpha,beta-olefinically unsaturated mononitriles having the structure

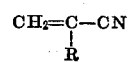

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile, and mixtures thereof.

The esters of olefinically unsaturated carboxylic acids useful in the present invention are preferably the lower alkyl esters and glycidyl esters of alpha,beta-olefinically unsaturated carboxylic acids and more preferably esters having the structure

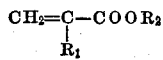

wherein $R_1$ is hydrogen, an alkyl group having from 1 to 4 carbon atoms, or a halogen, and $R_2$ is an alkyl group having from 1 to 6 carbon atoms, an allyl group, or an epoxy radical having from 2 to 6 carbon atoms. Compounds of this type include methyl acrylate, ethyl acrylate, the propyl acrylates, the butyl acrylates, the amyl acrylates, the hexyl acrylates, allyl acrylates, and glycidyl acrylate; methyl methacrylate, ethyl methacrylate, the propyl methacrylates, the butyl methacrylates, the amyl methacrylates, the hexyl methacrylates, allyl methacrylate, and glycidyl methacrylate; methyl, alpha-chloroacrylate, ethyl,alpha-chloroacrylate, and the like. Most preferred in the present invention are methyl acrylate, ethyl acrylate, the propyl acrylates, the butyl acrylates, allyl acrylate, glycidyl acrylate, methyl methacrylate, ethyl methacrylate, allyl methacrylate, and glycidyl methacrylate.

The conjugated diene monomers useful in the present invention include butadiene-1,3, isoprene, chloroprene, bromoprene, cyanoprene, 2,3-dimethyl-butadiene-1,3, 2-ethyl-butadiene-1,3, 2,3-diethyl-butadiene-1,3, and the like, and others. Most preferred for the purpose of this invention are butadiene and isoprene because of their ready availability and their excellent copolymerization properties.

The polymeric compositions of the present invention can be prepared by any of the known general techniques for polymerization including the bulk polymerization, solution polymerization, and emulsion or suspension polymerization techniques by batch, continuous or intermittent addition of the monomers and other components. The preferred method is emulsion polymerization. The important point in the novel process of this invention is that the novel polymeric products are prepared by polymerizing the olefinically unsaturated nitrile and the ester of the olefinically unsaturated carboxylic acid in the presence of a preformed copolymer of the conjugated diene monomer and the ester of the olefinically unsaturated carboxylic acid. The polymerization is preferably carried out in an aqueous medium in the presence of an emulsifier and a free-radical generating polymerization initiator at a temperature of from about 0 to 100° C. in the substantial absence of molecular oxygen. The physical blending of a copolymer of the conjugated diene monomer and an ester of an olefinically unsaturated carboxylic acid with a copolymer of the olefinically unsaturated nitrile and an ester of an olefinically unsaturated carboxylic acid does not produce polymeric products which resemble in physical properties the polymeric products of the instant process.

The preferred polymeric compositions embodied herein are those resulting from the polymerization of 100 parts by weight of (A) at least 70% by weight of at least one nitrile monomer having the structure

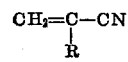

wherein R has the foregoing designation and (B) up to 30% by weight based on the combined weights of (A) and (B) of an ester having the structure

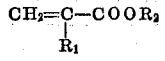

wherein $R_1$ and $R_2$ have the foregoing designations in the presence of from 1 to 40 parts by weight of (C) a rubbery copolymer of a conjugated diene monomer selected from the group consisting of butadiene and isoprene and at least one ester having the structure

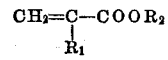

wherein $R_1$ and $R_2$ have the foregoing designations containing from 5 to 25% by weight of polymerized conjugated diene and from 75 to 95% by weight of polymerized ester.

More specifically, the present invention can be illustrated in the polymerization of a mixture of acrylonitrile and methyl acrylate in the presence of a preformed elastomer copolymer of ethyl acrylate and butadiene to produce a product having excellent impact strength, exceptionally good impermeability to gases and vapors when exposed to said gases and vapors in the form of a thin film or sheet, and excellent resistance to discoloration by heat.

In the foregoing polymerization, it is preferred that from about 1 to 40 and more preferably 1 to 20 parts of the elastomer copolymer of the conjugated diene and ester of an olefinically unsaturated carboxylic acid be employed for each 100 parts of combined acrylonitrile and methyl acrylate. It has generally been found that as the relative amount of the elastomer is increased in the final polymeric product, the impact strength increases and gas and vapor barrier properties decrease somewhat. It is generally preferred to use just enough of the elastomer to impart the desired impact strength to the polymeric product and to retain the optimum gas and vapor barrier properties in the polymeric product.

The novel polymeric products of the present invention are thermoplastic materials which can be thermoformed into a wide variety of useful articles in any of the conventional ways employed with known thermoplastic materials, such as by extrusion, milling, molding, drawing, blowing, etc. The polymeric products of this invention have excellent solvent resistance, and their impact strength, low permeability to gases and vapors, and color stability make them very useful in the packaging industry, and they are particularly useful in the manufacture of bottles, film, and other types of containers for liquids and solids.

In the following illustrative examples, the amounts of ingredients are expressed in parts by weight unless otherwise indicated.

EXAMPLE 1

(A) An elastomer of n-butyl acrylate, butadiene, and glycidyl acrylate was prepared as follows:

| Ingredient: | Parts |
|---|---|
| n-Butyl acrylate | 75 |
| Butadiene | 5 |
| Glycidyl acrylate | 20 |
| Sodium pyrophosphate·10H$_2$O | 0.95 |
| Hydrogen peroxide | 0.03 |
| Ferrous sulfate·7H$_2$O | 0.1 |
| S. F. flakes (fatty acid soap) | 5 |
| Water | 200 |

The polymerization was carried out at 40° C. with stirring and in the substantial absence of oxygen for about 21½ hours to a conversion of 89% by weight of monomers to polymer.

(B) A graft polymerization was carried out using the following ingredients:

| Ingredient: | Parts |
|---|---|
| Acrylonitrile | 75 |
| Methyl acrylate | 25 |
| Potassium persulfate | 0.06 |
| n-Dodecyl mercaptan | 0.5 |
| Hampene K$_4$100 [1] | 0.05 |
| Gafac RE 610-K [2] | 3 |
| Water (total) | 280 |
| Elastomer latex A (solids basis) | 20 |

[1] Tetrapotassium salt of ethylene diamine tetra-acetic acid (chelating agent).
[2] A mixture of R—O—(CH$_2$CH$_2$O—)$_n$PO$_3$M$_2$ and
[R—O—(CH$_2$CH$_2$O—)$_n$]$_2$PO$_2$M
wherein $n$ is a number of from 1 to 40, R is an alkyl or alkaryl group and preferably a nonyl phenyl group, and M is hydrogen, ammonia or an alkali metal, which composition is sold by GAF Corporation.

The graft polymerization was carried out at 60° C. with stirring in the substantial absence of oxygen for about 18 hours to a conversion of 95%. The final resin was isolated by coagulation with aluminum sulfate solution, was washed and dried and compression molded at 180° C. into test bars which were found to have a notched Izod impact strength of 3.6 foot pounds per inch of notch, and the molded bar was translucent.

EXAMPLE 2

(A) An elastomer was prepared by the polymerization of the following ingredients in the substantial absence of molecular oxygen at 60° C. for 32 hours with continuous agitation:

| Ingredient: | Parts |
|---|---|
| n-Butyl acrylate | 75 |
| Glycidyl acrylate | 20 |
| Butadiene | 5 |
| Na$_4$P$_2$O$_7$·10H$_2$O | 0.95 |
| Hydrogen peroxide | 0.03 |
| FeSO$_4$·7H$_2$O | 0.1 |
| Sodium lauryl sulfate | 3.5 |
| Distilled water | 200 |

Before the polymerization was started, the pH of the polymerization mixture was adjusted to 10.

(B) A graft copolymer resin of 75 acrylonitrile/25 methyl acrylate was prepared by polymerizing at 60° C. for 16 hours in the substantial absence of molecular oxygen the following ingredients:

| Ingredient: | Parts |
|---|---|
| Acrylonitrile | 75 |
| Methyl acrylate | 25 |
| K$_2$S$_2$O$_8$ | 0.06 |
| d-Limonene dimercaptan | 1 |
| Cafac RE 610 | 2 |
| Water | 200 |
| Rubber (latex (A) above), dry basis | 20 |

The resin latex was obtained in 100% conversion. The resin was isolated from the latex, was washed and dried and was found to have the following properties:

| | |
|---|---|
| Notched Izod impact strength (ASTM D–256) | 1.25 foot pounds per inch of notch. |
| Oxygen transmission rate (ASTM D–1434–66) | 5.98. |
| Water vapor transmission rate (ASTM E–96–63, Method E) | 8.94. |

Compression molded bars of this resin were translucent and slightly yellow.

EXAMPLE 3

The procedures of Example 2(A) and (2B) were repeated except that in (A) the monomer charge for the elastomer was 70 n-butyl acrylate, 25 glycidyl acrylate, and 5 butadiene. The final resin was obtained in 100% conversion and was found to have the following properties:

| | |
|---|---|
| ASTM notched Izod impact strength | 1.08 foot pounds per inch of notch. |
| ASTM oxygen transmission rate | 3.92. |
| ASTM water vapor transmission rate | 10.91. |

Compression molded bars of this resin were found to be translucent and slightly yellow.

EXAMPLE 4

The procedures of Example 2(A) and 2(B) were repeated except that the monomer charge in the elastomer preparation (A) was 70 ethyl acrylate, 15 glycidyl acrylate, and 15 butadiene. The final resin was found to have the following properties:

| | |
|---|---|
| ASTM notched Izod impact strength | 1.62 foot pounds per inch of notch. |
| ASTM oxygen transmission rate | 2.36. |
| ASTM water vapor transmission rate | 10.74. |
| Brabender plasticorder torque | 1340 meter grams. |
| Yellowness index (ASTM D–1925) | 50. |

The ASTM yellowness index was run on a disc of resin molded at 160° C. As a control, an acrylonitrile/methyl acrylate copolymer prepared in the presence of 9 parts of a nitrile rubber (70 butadiene/30 acrylonitrile) according to U.S. Pat. No. 3,426,102 was found to have a yellowness index of 55.

EXAMPLE 5

The procedures of Example 2(A) and 2(B) were repeated except that the monomer charge in the elastomer preparation (A) was 50 ethyl acrylate, 25 allyl methacrylate, and 25 butadiene. The final resin was found to have the following properties:

ASTM notched Izod impact strength _____ 1.18 foot pounds per inch of notch.
ASTM oxygen transmission rate __ 1.68.
ASTM water vapor transmission rate _____ 7.82.

A compression molded bar of this resin was found to be clear and very slightly yellow with an ASTM yellowness index of 36.

EXAMPLE 6

The procedures of Example 2(A) and 2(B) were repeated except that the monomer charge for the elastomer preparation (A) was 50 n-butyl acrylate, 25 glycidyl acrylate, and 25 butadiene. The final resin was found to have the following properties:

ASTM notched Izod impact strength _____ 1.78 foot pounds per inch of notch.
ASTM oxygen transmission rate __ 2.17.
ASTM water vapor transmission rate _____ 8.11.
Brabender plasticorder torque ___ 1950 meter grams.

A compression molded bar of this resin was clear with only a very slight haze and was very slightly yellow in color.

We claim:

1. The polymeric composition resulting from the polymerization of 100 parts by weight of
    (A) at least 70% by weight of at least one nitrile monomer having the structure

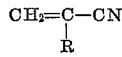

wherein R is hydrogen, a lower alkyl group having from 1 to 4 carbon atoms, or a halogen, and
    (B) up to 30% by weight based on the combined weights of (A) and (B) of an ester having the structure

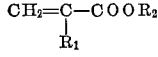

wherein $R_1$ is hydrogen, an alkyl group having from 1 to 4 carbon atoms, or a halogen, and $R_2$ is an alkyl group having from 1 to 6 carbon atoms, an allyl group, or an epoxy group having from 2 to 6 carbon atoms
in the presence of from 1 to 40 parts by weight of
    (C) a rubbery copolymer of a conjugated diene monomer selected from the group consisting of butadiene and isoprene and at least one ester having the structure

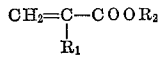

wherein $R_1$ and $R_2$ have the foregoing designations wherein said rubbery copolymer
contains from 5 to 25% by weight of polymerized conjugated diene and from 75 to 95% by weight of polymerized ester.

2. The composition of claim 1 wherein the nitrile is acrylonitrile.

3. The composition of claim 2 wherein the conjugated diene monomer is butadiene.

4. The composition of claim 3 wherein the ester is at least one member selected from the group consisting of methyl acrylate, ethyl acrylate, the propyl acrylates, the butyl acrylates, allyl acrylate, glycidyl acrylate, methyl methacrylate, ethyl methacrylate, allyl methacrylate, and glycidyl methacrylate.

5. The process for preparing a polymer comprising polymerizing at a temperature in the range of from about 0 to 100° C. in the substantial absence of oxygen in an aqueous medium 100 parts by weight of
    (A) at least 70% by weight of at least one nitrile monomer having the structure

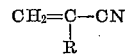

wherein R is hydrogen, a lower alkyl group having from 1 to 4 carbon atoms, or a halogen, and
    (B) up to 30% by weight based on the combined weights of (A) and (B) of an ester having the structure

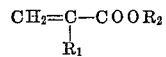

wherein $R_1$ is hydrogen, an alkyl group having from 1 to 4 carbon atoms, or a halogen, and $R_2$ is an alkyl group having from 1 to 6 carbon atoms, an allyl group, or an epoxy group having from 2 to 6 carbon atoms
in the presence of from 1 to 40 parts by weight of
    (C) a rubbery copolymer of a conjugated diene monomer selected from the group consisting of butadiene and isoprene and at least one ester having the structure

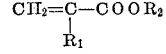

wherein $R_1$ and $R_2$ have the foregoing designations wherein said rubbery copolymer
contains from 5 to 25% by weight of polymerized conjugated diene and from 75 to 95% by weight of polymerized ester.

6. The process of claim 5 carried out in an aqueous emulsion.

7. The process of claim 6 wherein the nitrile is selected from the group consisting of acrylonitrile and methacrylonitrile.

8. The process of claim 7 wherein the nitrile is acrylonitrile.

9. The process of claim 8 wherein the conjugated diene monomer is butadiene.

10. The process of claim 9 wherein the ester is at least one member selected from the group consisting of methyl acrylate, ethyl acrylate, the propyl acrylates, the butyl acrylates, allyl acrylate, glycidyl acrylate, methyl methacrylate, ethyl methacrylate, allyl methacrylate, and glycidyl methacrylate.

References Cited

UNITED STATES PATENTS

| | | | |
|---|---|---|---|
| 3,262,993 | 7/1966 | Hagemeyer | 260—879 |
| 3,405,087 | 10/1968 | Fryd | 260—876 R |
| 3,426,102 | 2/1969 | Solak | 260—879 |
| 3,549,725 | 12/1970 | Rose | 260—879 |
| 3,586,737 | 6/1971 | Duke | 260—879 |
| 3,671,607 | 6/1972 | Lee | 260—879 |
| 3,676,526 | 6/1972 | Sommerfeld | 260—836 |
| 3,742,092 | 6/1972 | Duke | 260—879 |

PAUL LIEBERMAN, Primary Examiner

U.S. Cl. X.R.

260—29.7 UP, 879